(12) United States Patent
Zhang

(10) Patent No.: US 12,455,617 B2
(45) Date of Patent: Oct. 28, 2025

(54) METHOD, APPARATUS, DEVICE AND STORAGE MEDIUM FOR OBJECT TRACKING

(71) Applicant: Beijing Zitiao Network Technology Co., Ltd., Beijing (CN)

(72) Inventor: Xiuzhi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/823,231

(22) Filed: Sep. 3, 2024

(65) Prior Publication Data

US 2025/0076967 A1 Mar. 6, 2025

Related U.S. Application Data

(63) Continuation of application No. PCT/CN2024/114069, filed on Aug. 22, 2024.

(30) Foreign Application Priority Data

Aug. 31, 2023 (CN) .......................... 202311120591.1

(51) Int. Cl.
*G06F 3/01* (2006.01)
*G01P 13/00* (2006.01)
(Continued)

(52) U.S. Cl.
CPC .............. *G06F 3/011* (2013.01); *G01P 13/00* (2013.01); *G06F 3/014* (2013.01); *G06F 3/0304* (2013.01); *G06F 3/0346* (2013.01); *G06F 3/038* (2013.01)

(58) Field of Classification Search
CPC ............ G06F 3/011–014; G06F 3/017; G06F 3/0304; G06F 3/033; G06F 3/0346; G06F 3/038; G06F 3/039
See application file for complete search history.

(56) References Cited

U.S. PATENT DOCUMENTS 8,077,914 B1 * 12/2011 Kaplan .................. A61B 3/113
382/103
9,910,506 B2 * 3/2018 Spiessl ............... G02B 27/0172
(Continued)

FOREIGN PATENT DOCUMENTS

CN 110612506 A 12/2019
CN 112214106 A 1/2021
(Continued)

OTHER PUBLICATIONS

International Search Report and Written Opinion for International Application No. PCT/CN2024/114069, mailed Oct. 16, 2024, 14 Pages.
(Continued)

*Primary Examiner* — Patrick F Marinelli

(57) ABSTRACT

According to embodiments of the disclosure, a method, an apparatus, a device, and a storage medium for object tracking are provided. The method includes determining an optical configuration associated with an operating mode of a first device, the first device comprising a motion sensor and at least one light emitting element, the optical configuration used for controlling light emission of the at least one light emitting element; and setting up the first device based at least on the optical configuration to perform object tracking by tracking light emitted by the at least one light emitting element and/or according to sensing data of the motion sensor. Thus, different configurations can be made for different operating modes. In this way, different tracking requirements can be satisfied and a tracking device with good extensibility can be realized.

19 Claims, 10 Drawing Sheets

(51) Int. Cl.
  *G06F 3/03* (2006.01)
  *G06F 3/0346* (2013.01)
  *G06F 3/038* (2013.01)

(56) References Cited

U.S. PATENT DOCUMENTS

| | | | | |
|---|---|---|---|---|
| 10,241,573 | B2* | 3/2019 | Mallinson | A63F 13/235 |
| 10,574,938 | B1* | 2/2020 | Trail | H04N 7/0127 |
| 10,610,788 | B2* | 4/2020 | Mikhailov | G06F 3/017 |
| 11,165,141 | B2* | 11/2021 | Hsu | H01Q 1/273 |
| 11,175,734 | B1* | 11/2021 | Hossain | G06F 3/014 |
| 11,836,301 | B2* | 12/2023 | Mounier | G06T 7/20 |
| 12,013,988 | B1* | 6/2024 | Golovanov | G06F 3/012 |
| 12,062,189 | B2* | 8/2024 | Chen | G06T 7/246 |
| 12,135,922 | B2* | 11/2024 | Harrison | G06F 3/011 |
| 2016/0041624 | A1* | 2/2016 | Spiessl | G06F 3/011 345/8 |
| 2016/0364910 | A1 | 12/2016 | Higgins et al. | |
| 2016/0375364 | A1* | 12/2016 | Mikhailov | A63F 13/235 463/29 |
| 2017/0177090 | A1 | 6/2017 | Anderson | |
| 2017/0308166 | A1* | 10/2017 | Mallinson | A63F 13/212 |
| 2018/0329484 | A1 | 11/2018 | Steedly et al. | |
| 2019/0025931 | A1* | 1/2019 | Anderson | G02B 27/017 |
| 2019/0341677 | A1* | 11/2019 | Hsu | A44C 5/0007 |
| 2022/0067949 | A1* | 3/2022 | Chen | G06T 7/246 |
| 2022/0370895 | A1 | 11/2022 | Wu | |
| 2023/0048398 | A1* | 2/2023 | Mounier | G06F 3/011 |
| 2025/0076967 | A1* | 3/2025 | Zhang | G01P 13/00 |

FOREIGN PATENT DOCUMENTS

| | | |
|---|---|---|
| CN | 113318435 A | 8/2021 |
| CN | 111174683 B | 11/2021 |
| CN | 112451962 B | 11/2022 |
| EP | 3730899 A1 | 10/2020 |
| KR | 20220159679 A * | 12/2022 |

OTHER PUBLICATIONS

European Search Report for EP Patent Application No. 24761154.4, Issued on Aug. 28, 2025, 12 pages.

* cited by examiner

METHOD, APPARATUS, DEVICE AND STORAGE MEDIUM FOR OBJECT TRACKING

This application is a continuation of International Patent Application No. PCT/CN2024/114069, filed on Aug. 22, 2024, which claims priority to Chinese Patent Application No. 202311205911, filed on Aug. 31, 2023, entitled 'METHOD, APPARATUS, DEVICE, AND STORAGE MEDIUM FOR OBJECT TRACKING', both of which are incorporated herein by reference in its entirety.

FIELD

Example embodiments of the present disclosure generally relate to the field of computers, and more particularly, to a method, apparatus, device, and computer-readable storage medium for object tracking.

BACKGROUND

The extended reality (XR) technology includes a virtual reality technology (VR), an augmented reality technology (AR), a mixed reality technology (MR), and the like. With the development of the XR technology, experience content of the XR device becomes richer and richer. For example, a VR all-in-one machine supporting six degrees of freedom (DoF) is rapidly promoted in game content and user experience.

SUMMARY

In a first aspect of the present disclosure, a method of object tracking is provided. The method comprises: determining an optical configuration associated with an operating mode of a first device, the first device comprising a motion sensor and at least one light emitting element, the optical configuration used for controlling light emission of the at least one light emitting element; and setting up the first device based at least on the optical configuration to perform object tracking by tracking light emitted by the at least one light emitting element and/or according to sensing data of the motion sensor.

In a second aspect of the present disclosure, an apparatus for object tracking is provided. The apparatus comprises: an optical configuration determination module configured to determine an optical configuration associated with an operating mode of a first device, the first device comprising a motion sensor and at least one light emitting element, the optical configuration used for controlling light emission of the at least one light emitting element; and a device setting module configured to set up the first device based at least on the optical configuration to perform object tracking by tracking light emitted by the at least one light emitting element and/or according to sensing data of the motion sensor.

In a third aspect of the present disclosure, there is provided an electronic device, the device comprising at least one processing unit; and at least one memory coupled to the at least one processing unit and storing instructions for execution by the at least one processing unit. The instructions, when executed by the at least one processing unit, cause the device to perform the method of the first aspect.

In a fourth aspect of the present disclosure, a computer readable storage medium is provided, where the computer readable storage medium stores a computer program, and the computer program is executable by a processor to implement the method in the first aspect.

It should be appreciated that what is described in this Summary is not intended to limit critical features or essential features of embodiments of the disclosure, nor is it intended to limit the scope of the disclosure. Other features of the present disclosure will become readily appreciated from the following description.

BRIEF DESCRIPTION OF THE DRAWINGS

The above and other features, advantages, and aspects of various embodiments of the present disclosure will become more apparent with reference to the following detailed description taken in conjunction with the accompanying drawings. In the drawings, the same or similar reference numerals denote the same or similar elements, wherein.

DETAILED DESCRIPTION

Figure 1:
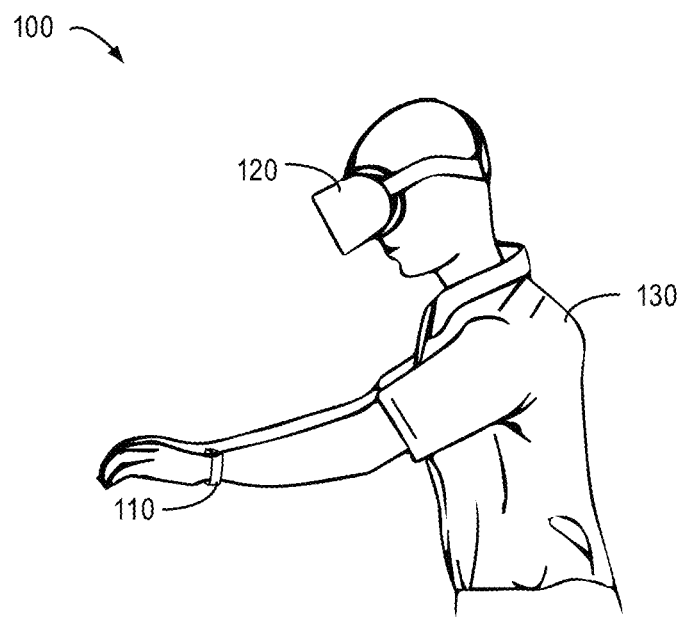
FIG. 1 illustrates a schematic diagram of an example environment in which embodiments of the present disclosure can be implemented.

It should be understood that, before the technical solutions disclosed in the embodiments of the present disclosure are used, the user should be informed of the type of the personal information, the usage range, the usage scene, and the like related to the present disclosure in an appropriate manner and the authorization of the user should be obtained according to relevant legal regulations.

For example, in response to receiving an active request from a user, prompt information is sent to the user to explicitly prompt the user that an operation requested by the user will require acquisition and use of personal information of the user. Thus, the user can autonomously select, according to the prompt information, whether to provide personal information to software or hardware such as an electronic device, an application program, a server, or a storage medium that executes the operations of the technical solutions of the present disclosure.

As an optional but non-limiting implementation, in response to receiving an active request of a user, a manner of sending prompt information to the user may be, for example, a manner of a pop-up window, where the pop-up window may present the prompt information in a text manner. In addition, the popup window may also carry a selection control for the user to select 'agree' or 'don't agree' to provide personal information to the electronic device.

It can be understood that, the above notification and acquisition of the user authorization process are merely exemplary, and do not limit the implementation of the present disclosure, and other methods meeting relevant legal regulations may also be applied to the implementation of the present disclosure.

It is to be understood that the data involved in the technical solution (including but not limited to the data itself, the acquisition or use of the data) should comply with the requirements of the corresponding legal regulations and related provisions.

Embodiments of the present disclosure will be described in more detail below with reference to the accompanying drawings. Although certain embodiments of the present disclosure are shown in the accompanying drawings, it should be understood that the present disclosure may be implemented in various forms and should not be construed as limited to the embodiments set forth herein, but rather, these embodiments are provided for a thorough and complete understanding of the present disclosure. It should be understood that the drawings and embodiments of the present disclosure are only for illustrative purposes and are not intended to limit the scope of the present disclosure.

It should be noted that the headings of any section/subsection provided herein are not limiting. Various embodiments are described throughout herein, and any type of embodiment can be included under any section/subsection. Furthermore, embodiments described in any section/subsection may be combined in any manner with any other embodiments described in the same section/subsection and/or different sections/subsections.

In the description of the embodiments of the present disclosure, the term "including" and the like should be understood as open-ended including, that is, "including but not limited to". The term "based on" should be read as "based at least in part on." The term "one embodiment" or "the embodiment" should be read as "at least one embodiment". The term "some embodiments" should be understood as "at least some embodiments." Other explicit and implicit definitions may also be included below. The terms "first", "second", etc. may refer to different or identical objects. Other explicit and implicit definitions may also be included below.

As mentioned briefly above, with the development of XR technology, some game-based applications, sports-based applications, and medical rehabilitation-based applications start to support XR devices. For example, some VR 6DoF games and applications rely primarily on 6DoF function implementations of head mounted display devices and grips. Basic actions of game and application interaction can be accomplished by wearing the display device and the grip. However, some physical actions cannot be achieved, such as walking, running, sitting, squatting, dancing, kicking, yoga, etc. Failure in tracking physical actions greatly impacts the user experience.

Some tracking solutions include an outside-in tracking technology that may rely on external cameras and localizers to capture and track body actions. For example, the position information of the body part is located by arranging a laser tower outside, and then such position information is transmitted to a PC or an all-in-one machine through USB or wirelessly, so as to track the body actions. However, this implementation has some obvious disadvantages. First, the installation process is complex, requiring the use of a plurality of localizers (at least two) to form a 360° C. overlay to establish three-dimensional position information. Second, the use of complexity, especially for an all-in-one machine, requires correcting the positional relationships of the all-in-one machine and the localizer. Third, the location data transfer delay is large. Fourth, if the tracked object is far from the scan range of the localizer or blocked by an item, an accurate location cannot be obtained.

In some tracking solutions, a plurality of trackers including both a light-emitting element and an inertial measurement unit (IMU) are worn on a body, and based on a technology combining optical tracking and inertial tracking, a pose of each tracker is jointly recognized so as to infer a body action or perform other operations. However, in different XR application scenes, inputs related to body motion postures need to be acquired differently. For example, it may be more focused in dance or fitness applications on how to obtain motion postures of a user's lower limbs. For another example, more attention is paid to how to acquire a motion posture of a user's arm or a posture of a hand (for example, a stick or a handle) in a ball or shooting game application. In each scene, a wearing or mounting manner of a tracker, a communication manner with a head-mounted display, a control manner of a light-emitting element, and processing logic for image data and IMU data are greatly different. In view of the above, a systematic solution cannot be applied to a plurality of scenes; however, designing optical tracking and IMU tracking devices for each scene and each use would introduce a plurality of problems such as high costs, poor expandability, and inconvenience for a user.

Embodiments of the present disclosure propose a solution for object tracking. According to various embodiments of the present disclosure, an optical configuration associated with an operating mode of a first device is determined. The first device includes a motion sensor and at least one light emitting element. The optical configuration is used to control light emission of the at least one light emitting element. The first device is set up based at least on the determined optical configuration to perform object tracking, e. g., tracking of the person wearing the first device or tracking of the first device itself, by tracking the light emitted by the at least one light emitting element and/or according to the sensing data of the motion sensor. Thus, by controlling light emission of the light emitting elements in association with the operating modes, different configurations can be made for different operating modes. In this way, different tracing requirements can be met, so as to implement a tracing device with high expandability.

Example Environment

FIG. 1 shows a schematic diagram of an example environment 100 in which embodiments of the present disclosure can be implemented. In the environment 100, an object 130 (also referred to as a user) wears a second device 120. The second device 120 may be a head-mounted or wearable display device, such as a head-mounted display or smart glasses, and supports VR, AR, MR, and other technologies. The second device 120 may communicate with a remote device (not shown) to reconstruct a virtual scene for the object 130 or to fuse the virtual content and the real scene. In some embodiments, the second device 120 may be integrally designed with the remote device.

The environment 100 also involves to a first device 110. In some embodiments, the first device 110 may be worn by the object 130. For example, the first device 110 may be worn by the object 130 in a part such as a wrist, arm, waist, knee, vamp, ankle, or the like. The environment 100 may include a plurality of first devices 110. For example, the plurality of first devices 110 are worn by the object 130 on a left wrist, a right wrist, a left ankle, and a right ankle, respectively. In this case, the first device 110 may be in the form of a wrist ring, handle, belt, ankle ring, or the like.

In some embodiments, the first device 110 may be attached to the object 130 in any suitable manner. For example, the first device 110 may be held by object 130 or be disposed on a fixed or movable object in proximity to the object 130. In this case, the object 130 may be an object such as a club, a handle, a machine dog, or the like, to which the first device 110 may be attached.

The first device 110 may establish communication with the second device 120 via a wired link or a wireless link. The second device 120 may track the object 130 based on sensing data collected by itself and/or data uploaded by the first device 120.

It should be appreciated that the structure and functionality of the environment 100 are described for exemplary purposes only and are not intended to imply any limitation on the scope of the disclosure. Moreover, it should be understood that the above description of the first device 110 and the second device 120 is merely exemplary and not limiting. The first device 110 and the second device 120 may be implemented as various forms, structures, or categories of devices, and embodiments of the present disclosure is not limited in this regard.

Some example embodiments of the present disclosure will be described below with continued reference to the accompanying drawings.

Example Structure of First Device

In the environment 100, the first device 110 may include a motion sensor and at least one light emitting element. The light emitting element may include an active light emitting element and/or a passive light emitting element. The active light emitting element includes, for example, a visible light emitting diode, an infrared light emitting diode, or the like, and the passive light emitting element includes, for example, a marker formed of a reflective material. The second device 120 may include an image sensor (e. g., a camera). The second device 120 may perform object tracking by tracking light emitted by a light emitting element on the first device 110 and/or according to sensing data of a motion sensor. For example, the first device 110 itself may be tracked and/or the object 130 wearing the first device 110 may be further tracked. As an example, the second device 120 may determine a pose of the first device 110 relative to the second device 120 according to light emitted by a light emitting element on the first device 110 and/or according to sensor data of a motion sensor. Further, the second device 120 may determine, based on its own pose in the space, a pose of the first device 110 in the space. Thus, the first device 110 may be tracked. Still further, the object may be tracked based on a connection relationship between the first device 110 and an object that wears or attaches the first device 110. The tracked object may include, but is not limited to, a human body, a human body part, an item such as a racket, a handle, etc.

In order to more clearly understand the object tracking scheme according to embodiments of the present disclosure, an example structure of the first device 110 will be described below with reference to FIGS. 2A to 2C.

Figure 2A:
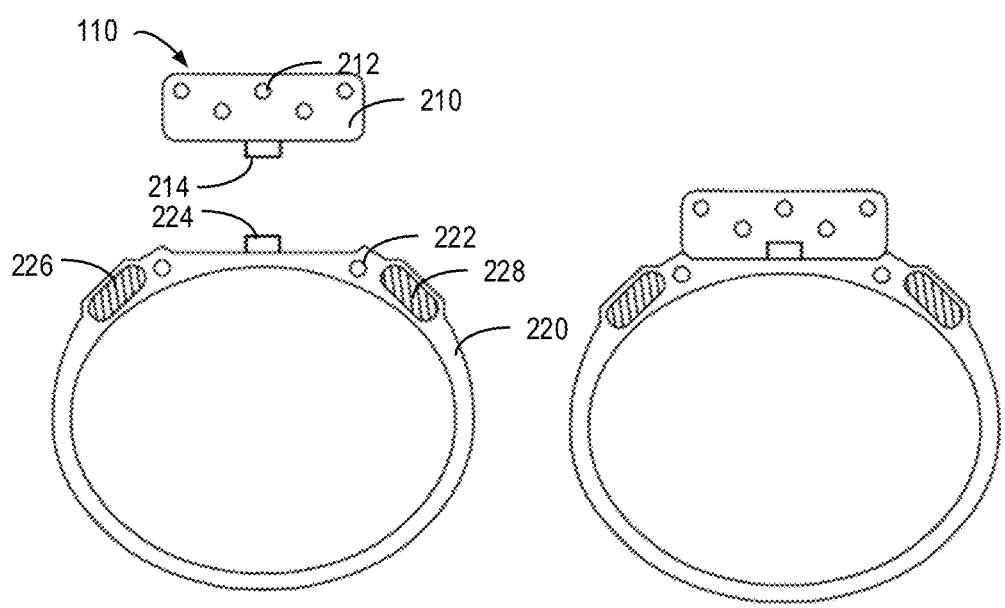
FIGS. 2A-2C illustrate schematic diagrams of various example structures of a first device according to some embodiments of the present disclosure.

In the example of FIG. 2A, the first device 110 includes at least a body 210 (also referred to as a body). In some embodiments, the first device 110 may be attached to a base 220 (also referred to as a stand), for example, through the body 210. Alternatively, in some embodiments, the base 220 may be part of the first device 110. The body 210 includes at least one light emitting element 212, a communication interface 214, and a wireless communication module (not shown). The light emitting element on the body is also referred to as a first light emitting element only for convenience of subsequent description. Such a first light emitting element is disposed on a side of the body 210 facing the second device 120, so that the first device 120 tracks light emitted by the first light emitting element. In some embodiments, the number of the first light emitting elements exceeds a predetermined number, e. g., 2. The plurality of first light emitting elements may be arranged in a staggered manner to facilitate identification by the second device 120. The communication interface 214 is disposed on a side or a bottom surface facing the base 220. The body 210 may establish a wireless communication connection with the second device 120 through the wireless communication module, for transmitting various data, such as sensing data, configuration data, and the like.

In the example of FIG. 2A, the body 210 and base 220 are detachable. Thus, it may be achieved that the same body fits different bases, and that the same base fits different bodies. In this way, the mounting manner of the body 210 and the base 220 includes, but is not limited to, elastic snap-fastening, magnetic attraction, rotational snap-fitting, pressing and locking and then pressing and ejecting, etc. A schematic diagram in which the body 210 is separated from the base 220 is shown on the left in FIG. 2A, and a schematic diagram in which the body 210 is mounted on the base 220 is shown on the right in FIG. 2A. Based on different wearing positions, the base 220 may comprise a rigid material (e. g. PVC or metal), a flexible material (e. g. an elastic strap) or a combination thereof to improve wearing comfort.

In some embodiments, the base 220 may include at least one light emitting element 222. The light emitting element on the base is also referred to as a second light emitting element for ease of subsequent description only. At least one second light emitting element is mounted on a face of the base 220 facing the second device 120, so as to facilitate the second device 120 to track light emitted by the second light emitting element. In some embodiments, the number of the second light-emitting elements exceeds a predetermined number, for example, two second light-emitting elements, and the plurality of second light-emitting elements are disposed at two ends of the base 220 or are arranged to be staggered with the first light-emitting elements, so as to facilitate recognition of the second device 120.

The base 220 may further include a communication interface 224 and a wireless communication module (not shown). When the body 210 is mounted on the base 220, the communication interface 224 and the communication interface 214 may be connected to each other. The connection between communication interface 224 and communication interface 214 may be any suitable form of connection, including a wired connection (e. g., hard-wired connection, slotted connection) and/or a wireless connection (e. g., near field communication, radio frequency identification technology). Thus, the base 220 establishes a communication connection with the first device 110. The base 220 may transmit signals, transmit data, etc., to the first device 110 (e. g., the body 210). In some embodiments, the base 220 may establish a wireless communication connection with the second device 120 through a wireless communication module, so as to transmit sensing data, configuration data, and the like.

The base 220 may further include a vibration motor 226. The vibration motor 226 is configured to provide vibration feedback. For example, in a game, when an arm that wears the first device 110 performs a striking action, the vibration motor 226 may provide strong vibration feedback, so as to improve a sense of immersion in the game. As another example, the vibration motor 226 may be slightly vibrating to alert the user when attention is desired or an abnormal condition occurs.

The first device 110 may further include a motion sensor (not shown) configured to collect sensing data related to the movement of the first device 110. In some embodiments, the motion sensor may include a triaxial gyroscope for detecting rotation angles such as pitch, roll, yaw, etc., such that the first device 110 supports 3DoF. Additionally or alternatively, the motion sensor may include a three-axis accelerometer, such that the first device 110 supports 6DoF. Additionally, or alternatively, the motion sensor may include a magnetometer to detect directions such as east, west, south, north, etc., relative to the Earth's magnetic field. Additionally or alternatively, the motion sensor may include an IMU.

The base 220 may also include a battery 228. The battery 228 may be used to power the second light emitting element, the vibration motor 226, and the wireless communication module. In some embodiments, the battery 228 may be used to supply power to the body 210 via the communication interface 224 and the communication interface 214 to drive the first light emitting element to emit light, etc.

Figure 2B:
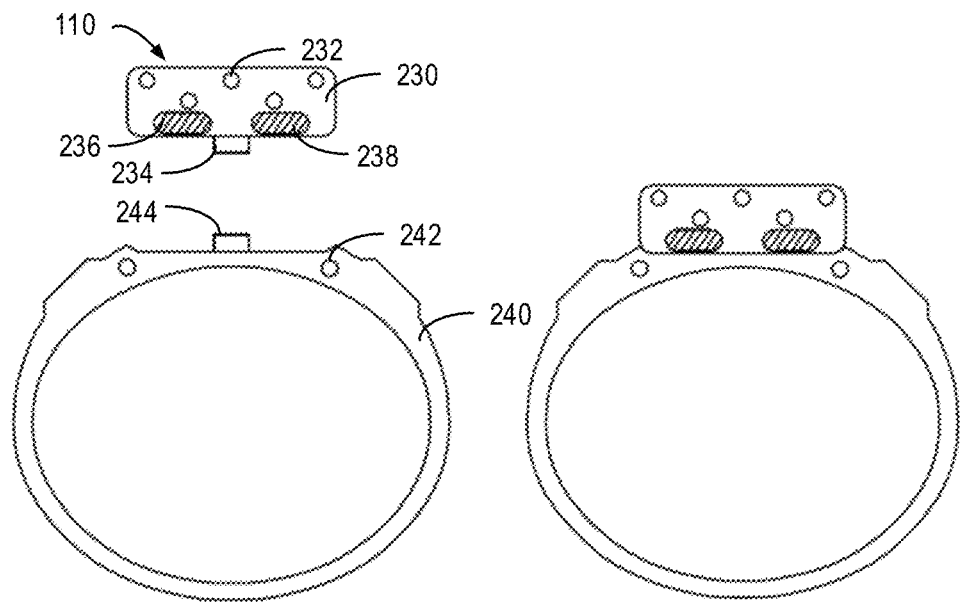
Figure 2C:
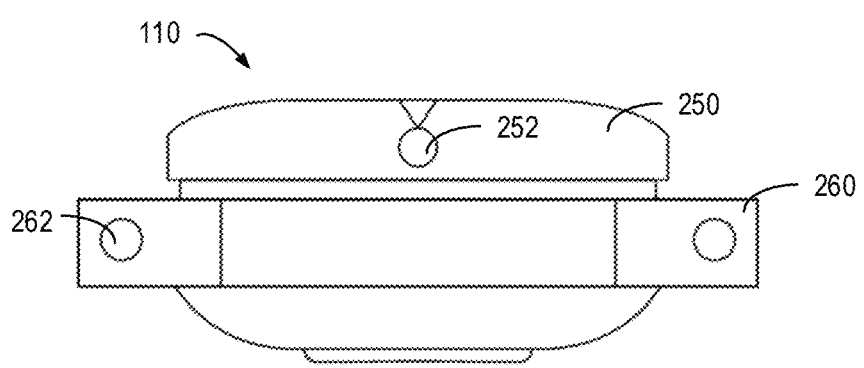

In the example of FIG. 2B, the first device 110 generally includes a body 230 and is attached to a base 240 by the body 230. In some embodiments, the first device 110 may include a body 230 and a base 240. The body 230 includes at least one light emitting element 232, a communication interface 234, and a wireless communication module (not shown). Alternatively, the base 240 may include at least one light emitting element 242, a communication interface 244, a wireless communication module (not shown), and a motion sensor (not shown). The body 230 may establish a wireless communication connection with the second device 120 through a wireless communication module for transmitting various data, such as sensing data, configuration data, etc.

In some embodiments, referring to FIG. 2B, the body 230 may also include a vibration motor 236 and a battery 238. The battery 238 may be used to supply power to the light-emitting element 232, and may also be used to supply power to the base 240 via the communications interface 234 and the communications interface 244. That is, the first device 110 may supply power to the base 220. A power supply supplied by the first device 110 may be used to drive the light emitting element 242 to emit light.

In the example of FIG. 2A and FIG. 2B, the first device 110 may be worn by the object 130. In the example of FIG. 2C, the first device 110 may be disposed on an item in proximity to object 130. For example, the first device 110 includes a body 250 and is attached to a base 260, or the first device 110 may include a base 260. The base 260 is generally circular and includes two light-emitting elements 262. The body 250 is generally cylindrical and includes a light-emitting element 252.

The structure of the first device 110 is described above by way of example in FIG. 2A-C. It should be understood that this is merely exemplary and does not constitute a limitation on the present disclosure.

Example Operating Modes

The object tracking method according to an embodiment of the present disclosure may be performed by the first device 110, may alternatively be performed by the second device 120, or may be performed by both. Alternatively or additionally, the object tracking method according to embodiments of the present disclosure may be performed by a remote device. The various embodiments are described below, by way of example only, and without limitation, with the first device 110 being executed as an example.

The optical configuration is used to control the light emission of at least one light emitting element in the first device 110. In embodiments of the present disclosure, the optical configuration is associated with an operating mode of the first device 110. In some embodiments, the operating mode may be related to the scene of object tracking. The scene may depend on the application with the object tracking or specific parts of the application with the object tracking. For example, different applications may correspond to different scenes. Also, different types of games, game scenes, or game nodes in the same application may correspond to different scenes. As an example, a corresponding operating mode may be determined according to an indication about a scene from an application layer. For instance, in the example of FIG. 3A, the first device 110 may be applied to a shooting-type game, and in the example of FIG. 3B, the first device 110 may be applied to a running-type application.

Alternatively or additionally, in some embodiments, the operating mode may be related to a base to which the first device 110 is attached or included. In such embodiments, the attached or included base may be determined from the identification signal from the base. After the body of the first device 110 is paired with the base, a signal from the base may be used as a basis of an operating mode. Such a signal may indicate information corresponding to the wearing position or the attachment position of the base. As such, the first device 110 may determine its operating mode.

In the presence of the second device 120, the second device 120 is typically worn at a predetermined position, also referred to as a wearing position, such as a head, of the object 130. In view of this, the operating mode may be related to the position of the base relative to the second device 120. In some embodiments, an operating mode corresponding to the first base located at the first predetermined position is a short range mode, and an operating mode corresponding to the second base located at the second predetermined position is a long range mode. The first predetermined position and the second predetermined position are associated with the object 130 wearing the second device 120, and the second predetermined position is farther away from the wearing position of the second device 120, e. g., the head, on the object 130 than the first predetermined position.

The first predetermined position is a position associated with the object 130. In some embodiments, the first predetermined position comprises a wearing position of a base in the first device 110 or attached to the first device 110. For example, referring to FIG. 2A, the first device 110 is worn at the wrist of the object 130 through the base 220, and then the first predetermined position may refer to the wrist. In some embodiments, the first predetermined position comprises a position in the first device 110 that corresponds to a position of attachment of the base. For example, in the example of FIG. 3A, the first device 110 includes a body 310 and a base 320. When such a first device 110 is held by an object 130, then the first predetermined position may refer to the position of the body 310.

The second predetermined position is a position associated with the object 130. In some embodiments, the second predetermined position comprises a worn position of a base in or attached to the first device 110. For example, referring to FIG. 3B, the first device 110 includes a body 330 and a base 340. The first device 110 is worn on an ankle of the subject 130 through the base 340, and then the second predetermined position may be referred to as the ankle.

With the first device 110 in the first predetermined position and/or the second predetermined position, the second device 120 may track the object 130 (e. g., the body part of the object 130 or a device associated therewith) by tracking light emitted by a light emitting element mounted on the first device 110 (e. g., collecting a spot image through an image sensor). Such a mode may also be referred to as an optical tracking mode.

Additionally, in some embodiments, a sensing configuration for a motion sensor (e. g., IMU) associated with the operating mode may also be determined, and the first device 110 is set up based on the sensing configuration and the optical configuration. In such an embodiment, the second device 120 may receive the sensing data of the motion sensor transmitted by the first device 110, and perform object tracking, for example, tracking the object 130, based on the light emitted by the light emitting element and the sensing data. In this manner, the combination of light tracking and motion sensing data may improve accuracy of tracking.

In some embodiments, at least one light emitting element in the first device 110 may be disabled if the operating mode indicates that the first device 110 is beyond the light tracking range for object tracking, e. g., if the first device 110 is at a third predetermined position beyond the light tracking range. That is, in this case, the first device 110 operates in the non-optical tracking mode. For example, the first device 110 is worn on the rear waist position of the object 130, thereby exceeding the field-of-view range of the image sensor. In this case, the second device 120 may receive sensing data of the motion sensor transmitted from the first device 110 and track the object 130 based only on the sensing data. In this manner, the working scene of the first device 110 may be distinguished by the light tracking range with respect to the second device 120. Additionally, in such embodiments, since the first device 110 is not already within the light tracking range of the second device 120, continuing to enable the light emitting elements in the first device 110 would not improve tracking accuracy, but rather would increase the energy consumption of the first device 110. Thus, in such embodiments, by controlling the first device 110 to be in the non-optical tracking mode, the energy consumption of the first device 110 may be reduced.

In some embodiments, after the first device 110 and a base are connected in a pairing manner, the attached base may be determined based on an identification signal from the base, and thus an operating mode thereof may be determined. Such an identification signal may indicate in particular that the base is a leg base, a waist base or a hand base.

The operating modes of the first device 110 are described above by various embodiments. The various operating modes are determined by the scene tracked with respect to the object, the light tracking range with respect to the second device 120, and the identification signal from the base. Further, the first device 110 may determine an optical configuration associated with the operating mode. Such an optical configuration may control light emission of the plurality of light emitting elements installed on the first device 110, so as to achieve the effects of saving electric energy and improving endurance while ensuring stable tracking.

In embodiments of the present disclosure, determining the optical configuration as a function of the base is a hardware-based implementation. In this case, regardless of the base to which the first device is connected, the first device can be appropriately configured, thereby achieving a convenient configuration. In addition, hardware-based implementations are fast and reliable. Determining optical configurations from a scene is a software-based implementation. This manner enables the first device to adapt to any application scene, thereby being more flexible. Determining an optical configuration according to a base and a scene can combine hardware and software implementation, thereby further improving flexibility and extensibility.

Example Optical Configurations

The second device 120 collects light (e. g., visible light) emitted by the light-emitting elements through an image sensor, and the light emitted by each light-emitting element forms a light spot. The proximity of the distance determines the distance between the spots. If these spots are too distant from the predetermined position of the second device 120, recognition may be hindered due to the spots being too dense. In order to adapt to the different operating modes, it is possible, for example, to selectively activate or deactivate all or some of the light emitting elements. Controlling the light emission of the light emitting element may be referred to as an optical configuration.

The optical configuration may include respective enabling states of the plurality of light emitting elements. In some embodiments, the first device 110 may disable a portion of the light emitting elements if the first device 110 is in the first predetermined position. In this way, the density of the spots can be reduced.

In the example of FIG. 2A, the body 210 includes a plurality of light-emitting elements 212. The base 220 includes a plurality of light-emitting elements 222. The arrangement of the plurality of light emitting elements 212 is denser than the arrangement of the plurality of light emitting elements 222. If such a first device 110 is in a first predetermined position, for example, worn on the ankle of the object 130, the first device 110 may disable some or all of the plurality of light emitting elements 212 on the body 210 and enable the plurality of light emitting elements 222 on the base 220. In this way, the distance between the light spots can be increased, thereby reducing the density of the light spots and facilitating recognition of the second device 120.

In some embodiments, the second light emitting element on the base may be disabled if the first device 110 is in the second predetermined position. With continued reference to FIG. 2, if such a first device 110 is in a second predetermined position, such as being worn on the wrist of the object 130, all of the light emitting elements 222 may be deactivated and some or all of the light emitting elements 212 enabled. In this way, the endurance can be increased.

If the number of light-emitting elements mounted on the first device 110 is small, an optical configuration may also be set in a targeted manner. In the example of FIG. 2C, the body 250 includes a light-emitting element 252. The base 260 includes two light-emitting elements 262. If such a first device 110 is located at the second predetermined position, only the light emitting element 252 may be activated and the light emitting element 262 may be deactivated. If such a first device 110 is in a first predetermined position, the light-emitting element 262 can be activated. In this way, the range of the light spot can be increased, facilitating identification by the second device 120.

Additionally or alternatively, the optical configuration may include a brightness of the light emitted by the enabled light emitting elements. Therefore, in addition to adjusting the density and range of the light spot, the brightness of the light emitted by the light-emitting element can also be adjusted, thereby achieving the effect of increasing the endurance time. In some embodiments, if the first device 110 is at the first predetermined position, it may be determined that the active light emitting element is emitting light at a higher brightness. If the first device 110 is located at the second predetermined position, it may be determined that the enabled light emitting element emits light at a lower luminance. Because even if the brightness of the light spot is low when the light spot is nearer to the predetermined position, the light spot can be easily recognized by the second device 120. Therefore, if the first device 110 is located at the second predetermined position, the luminance at which the light emitting element emits light can be appropriately decreased, for example, the light emitting element emits light with a luminance of 60%. If the first device 110 is located at the first predetermined position, the luminance at which the light emitting element emits light may be appropriately increased, for example, the light emitting element emits light with a luminance of 90%.

Additionally or alternatively, the first device 110 may determine the brightness of each enabled light emitting element so as to achieve the effect of reducing the brightness or increasing the brightness as a whole. For example, if the first device 110 is located at the second predetermined position, the brightness of half of the number of enabled light emitting elements may be controlled at 50%, and the brightness of the other half of the number of enabled light emitting elements may be controlled at 70%.

Figure 3A:
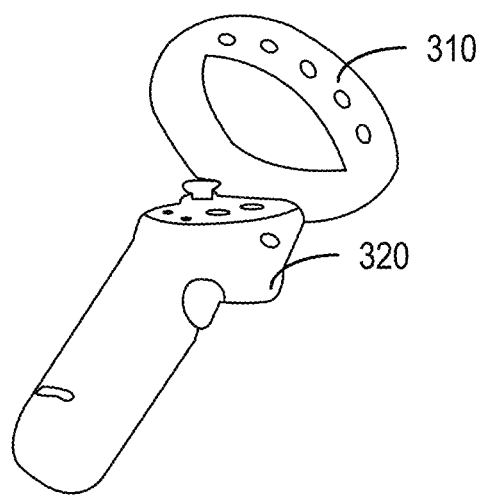
FIG. 3A illustrates a schematic diagram of an example of an attachment of a first device according to some embodiments of the present disclosure.
Figure 3B:
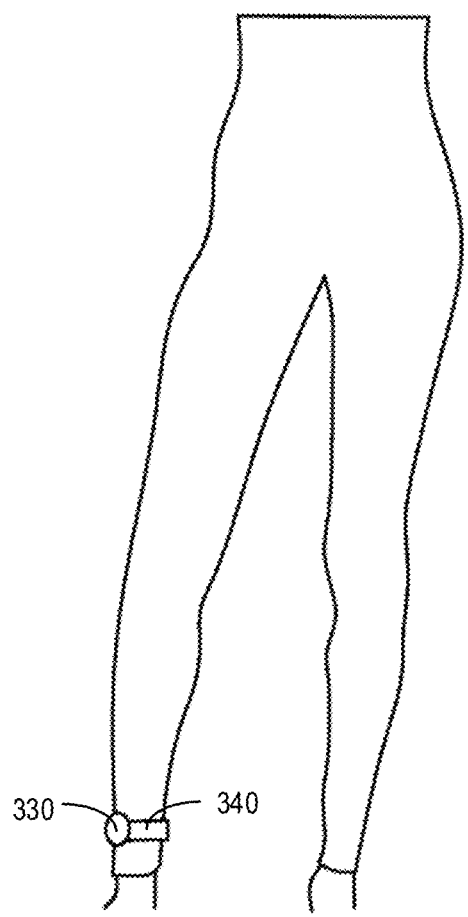
FIG. 3B illustrates a schematic diagram of an example of a wearing manner for a first device according to some embodiments of the present disclosure.

In the example of FIG. 3A, the body 310 is mounted to a grip holder. If such a first device 110 is held by the object 130, all of the light emitting elements on the body 310 may be activated to facilitate tracking of the second device 120 from various perspectives. However, only some of the light emitting elements may be activated if the body is mounted to some special base (e. g., a wraparound stand). In some embodiments, the first device 110 may determine whether there are light emitting elements specified as non-lighting in the plurality of light emitting elements based on the identification signal of the base, thereby disabling the light emitting elements specified as non-lighting for the purpose of improving endurance. For example, when the body is mounted to a wrapped holder, one or more of the light emitting elements on the body may be obscured by the holder. The identification information of the base indicates that there are light emitting elements that are blocked. The first device 110 may disable the corresponding light-emitting elements based on such identification signal.

The optical configuration of the first device 110 may be determined based on whether the light emitting element is within the light tracking range of the second device 120. In some embodiments, if the operating mode indicates that the first device 110 is out of the light tracking range for object tracking, the first device 110 may disable all light emitting elements. Since these light emitting elements are out of the light tracking range, whether these light emitting elements emit light does not affect the tracking of the second device 120 based on the sensing data of the motion sensor. In this manner, the endurance of the first device 110 may be improved.

Additionally or alternatively, the optical configuration may also include a light emission timing of the enabled light emitting elements. The light emission timing may include, but is not limited to, one or more of a light emission timing, a light emission frequency, or a light emission duration. When the plurality of first devices 110 operates at the same time, there is a possibility that the plurality of first devices 110 block each other or occur at the same time, thereby increasing difficulty of the second device 120 in distinguishing the plurality of first devices 110. In particular, in the case where the first device 110 is small in volume, or in the case where the optical shape of the first device 110 is kept uniform in consideration of later scalability and mass production cost, light emission can be performed at different timings by controlling light emitting elements enabled on each of the first devices 110.

In some embodiments, if the plurality of first devices 110 are operating simultaneously, the optical configuration of one first device 110 is associated with the respective operating modes of those first devices 110. In other words, in this case, the optical configuration of a certain first device 110 is associated not only with its own operating mode, but also with the operating modes of other first devices 110. As an example, two first devices 110 operate at the same time, for example, one first device 110 operates at a first predetermined position (for example, at the left ankle), and the other first device 110 operates at another first predetermined position (for example, at the right ankle). Then, the optical configuration of one first device 110 is not only related to its operating mode, but also related to the operating mode of the other first device 110. Thus, such two first devices 110 may be distinguished by an optical configuration (e. g., different spot patterns and/or different light emission timings).

In some embodiments, the optical configuration of one first device 110 may differ, at least in part, from the optical configuration of another first device 110. For example, the optical configuration may include light spot pattern formed by light emitting elements enabled on each first device 110. The light spot patterns may not be identical or at least partially different, so that the second device 120 distinguishes the first device 110 based on the patterns. In some embodiments, if the two first devices 110 are respectively located at a first generally symmetrical predetermined position or a second generally symmetrical predetermined position, the second devices 120 may be distinguished by different spot patterns. For example, the light spot pattern of the first device 110 located at the left wrist of the object 130 is in an 'L' shape, and the light spot pattern of the first device 110 located at the right wrist of the object 130 may be in an '|' shape.

Figure 4:
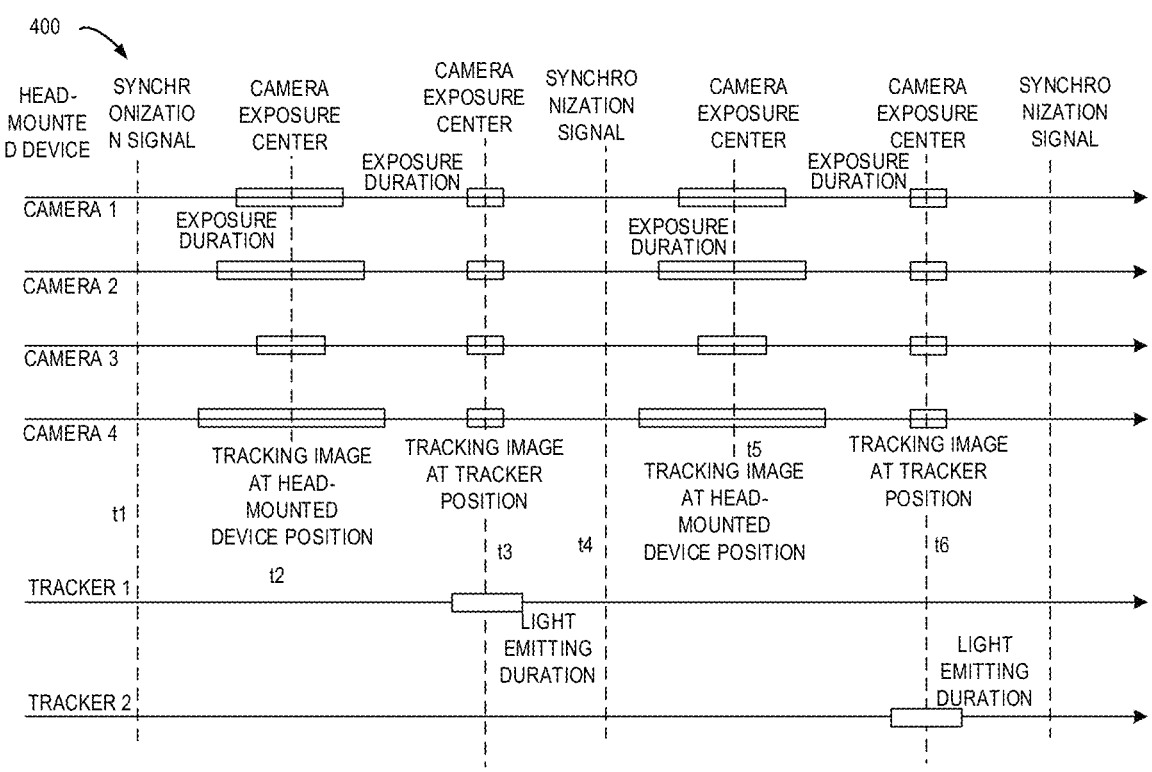
FIG. 4 illustrates a schematic diagram of a light emission timing of a light emitting element according to some embodiments of the present disclosure.

FIG. 4 illustrates a schematic diagram of a light emission timing 400 of a light emitting element according to some embodiments of the present disclosure. In the example of FIG. 4, the first device 110 includes a tracker 1 (e. g., located at the left hand of the user) and a tracker 2 (e. g., located at the right hand of the user). The second device 120 includes a head-mounted display (or head-mounted device for short, located at the head of the user). A camera 1, a camera 2, a camera 3, and a camera 4 are disposed on the head-mounted display. The cameras may collect image data at a predetermined frequency.

Referring to the light emission timing 400, at a t1 time instance, a head-mounted device sends a synchronization signal. These cameras can start exposure at respective time points and continue for a certain duration, but ensure that central points of the respective exposure durations are aligned at the t2 time instance, so as to collect a tracking image at the position of the head-mounted device in different field-of-view ranges. At t3 time instance, these cameras collect the tracking image of the tracker position at the center point of the same exposure duration and aligned duration. At this time instance, the tracker 1 emits light. The central point of the emission duration of the tracker 1 is not only aligned with the central point of the exposure duration of the camera, but also ensures that the emission duration is longer than the exposure duration. At t4 time instance, the head-mounted device sends a synchronization signal, and at t5 time instance, the camera acquires a tracking image at the position of the head-mounted device. At t6 time instance, the tracker 2 emits light, and the central point of the emission duration of the tracker 2 is not only aligned with the central point of the exposure duration of the camera, but also ensures that the emission duration is longer than the exposure duration. Thus, it is possible to achieve that the trackers 1 and 2 emit light at different timings. In this way, head-mounted recognition is facilitated.

In some embodiments, a first optical configuration may be determined based on a base to which the first device 110 is attached or included, and a second optical configuration different from the first optical configuration is determined based on the scene being tracked by the object. For example, the first optical configuration and the second optical configuration may be different types of configurations. As an example, the first optical configuration may be an enabling state of the light emitting element, and the second optical configuration may be a light emission timing of the enabled light emitting element. For example, in a dance application scene, two first devices 110 operate at the same time. One first device 110 operates at a first predetermined position (for example, a left ankle), and the other first device 110 operates at another first predetermined position (for example, a right ankle). The first optical configuration is determined based on the bases to which such two first devices 110 are attached (in this example, bases at the left and right ankles), e. g., a light emitting element on each of them may be enabled. Further, the second optical configuration is determined based on the dance application scene. For example, for the dance scene, it is required to track the actions of the left foot and the right foot respectively, that is, it is required to distinguish the left foot from the right foot. Accordingly, the light emission timing of the enabled light emitting elements may be configured such that the light emission timings of the two first devices 110 are shifted from each other.

In some embodiments, the first optical configuration and the second optical configuration may be determined by the first device 110. In some embodiments, the first optical configuration and the second optical configuration may be determined by the second device 120. In some embodiments, the first optical configuration may be determined by the first device 110 and the second optical configuration may be determined by the second device 120.

In some embodiments, the light emitting elements on the base may also emit light. Accordingly, a combined spot of light emitted by the light emitting elements on the first device 110 and light emitted by the light emitting elements on the base may be tracked. Thus, object tracking may be performed based on the tracking of the combined spot, e. g., tracking the body wearing the first device 110, and/or the first device 110 itself.

The optical configuration of the first device 110 is described above. According to various embodiments of the present disclosure, the present disclosure may provide a set of system solutions, including one or more first devices 110 used in conjunction with the second device 120. The first device 110 may be an integrated structure or a separable structure. The first device 110 may be disposed at a limb portion of the object 130 or disposed on a fixed or movable object in a real scene according to requirements. Further, for different scenes, the first device 110 may correspondingly perform optical configuration to meet specific tracking requirements in the scene. Such an optical configuration includes, for example, a configuration optically enabling and disabling each light emitting element on the body and the base of the first device 110, a brightness configuration of emitted light, a spot pattern configuration, and a light emission timing configuration. Specific examples of mode control of a plurality of trackers under different scenes are described below with reference to FIG. 5 and FIG. 6.

Figure 5:
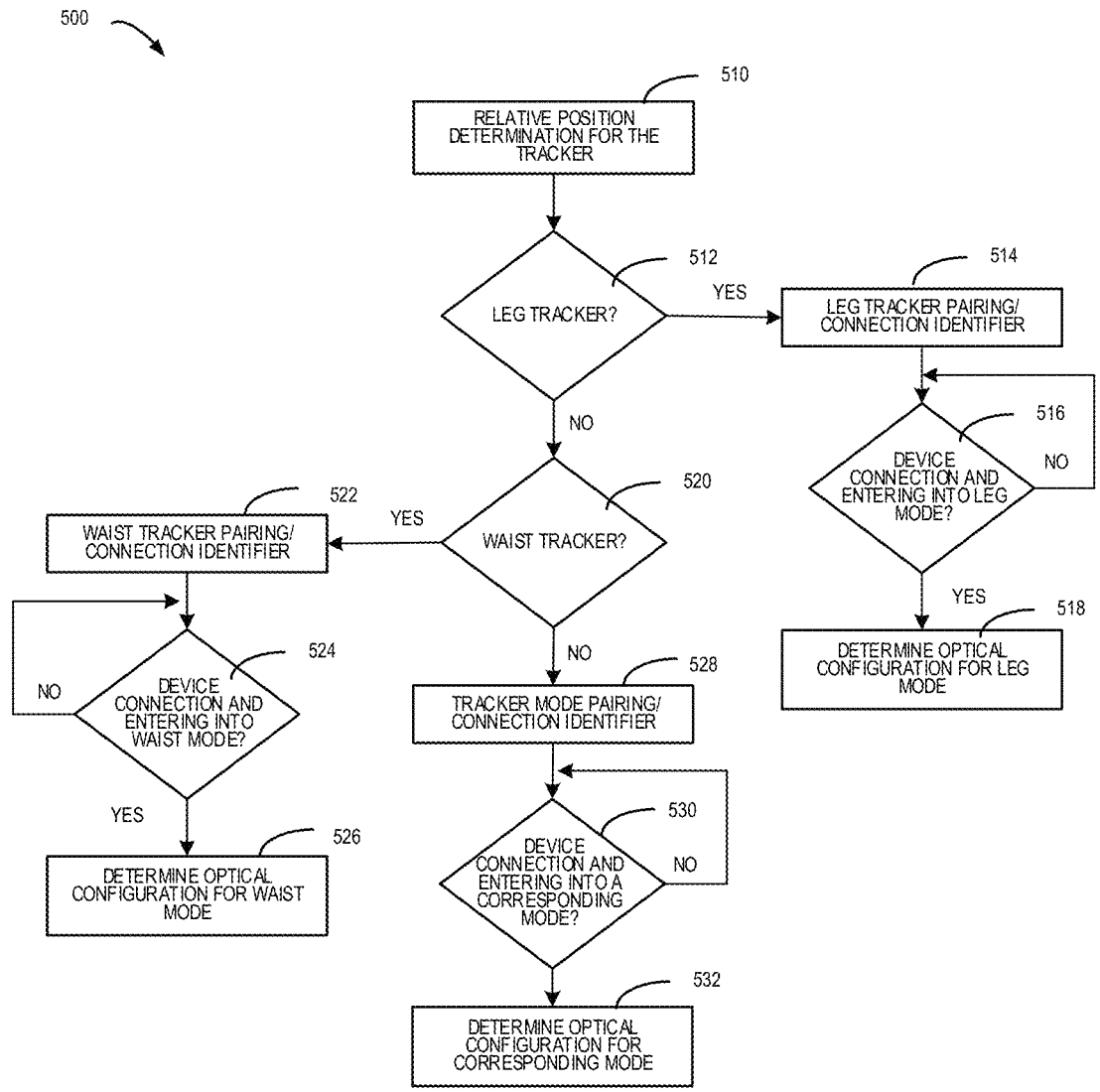
FIG. 5 illustrates a flowchart of an example process of identifying a tracker according to some embodiments of the disclosure.

FIG. 5 illustrates a flow diagram of an example process 500 of identifying a tracker according to some embodiments of the disclosure. The example process 500 involves a scene including a tracker and a head mounted display. The tracker is, for example, a separated structure (namely, a detachable structure), and comprises a body and a base. With the body mounted to the base, relative position determination for the tracker is initiated at block 510.

At block 512, if a leg tracker, i. e., the attached base is installed on the leg, the process proceeds to block 514. At block 514, the body and base are paired, and the body or base sends a connection identifier. At block 516, the tracker and head-mounted device connect and determine whether to enter leg tracking mode. If the leg tracking mode is entered, then the process proceeds to block 518. At block 518, the tracker or head mounted device may be assigned with the optical configuration associated with the leg mode. For example, some of the light emitting elements are enabled at a higher luminance and a lower density. After the optical configuration, the light emitting elements enabled on the tracker may not emit light immediately but are temporarily in a standby mode, and the enabled light emitting elements are controlled to emit light when a light emission indication (e. g., a head-mounted transmission signal) is received, thereby entering a tracking mode.

If it is determined at block 512 that it is not a leg tracker, the process 500 proceeds to block 520. If it is determined at block 520 that it is a waist tracker, i. e., that the attached base is mounted at the waist, the process 500 proceeds to block 522. At block 522, the object and the base are paired, and the object or base sends a connection identifier. At block 524, the tracker and the head-mounted device connect and determine whether to enter a waist tracking mode. If the waist tracking mode is entered, the process 500 proceeds to block 526. At block 526, the tracker or head mounted device may be assigned with the optical configuration associated with a waist mode. For example, all of the light emitting elements are disabled.

If, at block 520, it is determined that it is not a waist tracker, the process 500 proceeds to block 528. At block 528, the object and base are paired and the base sends a connection identifier. At block 530, the tracker and head mounted device connect and determine whether to enter a corresponding tracking mode, such as a hand mode. If the corresponding tracking mode is entered, the process 500 proceeds to block 532. At block 532, the optical configuration associated with the tracking mode may be assigned to the tracker or the head mounted. Using the hand mode as an example, part of the light emitting elements can be enabled at a lower luminance.

Figure 6:
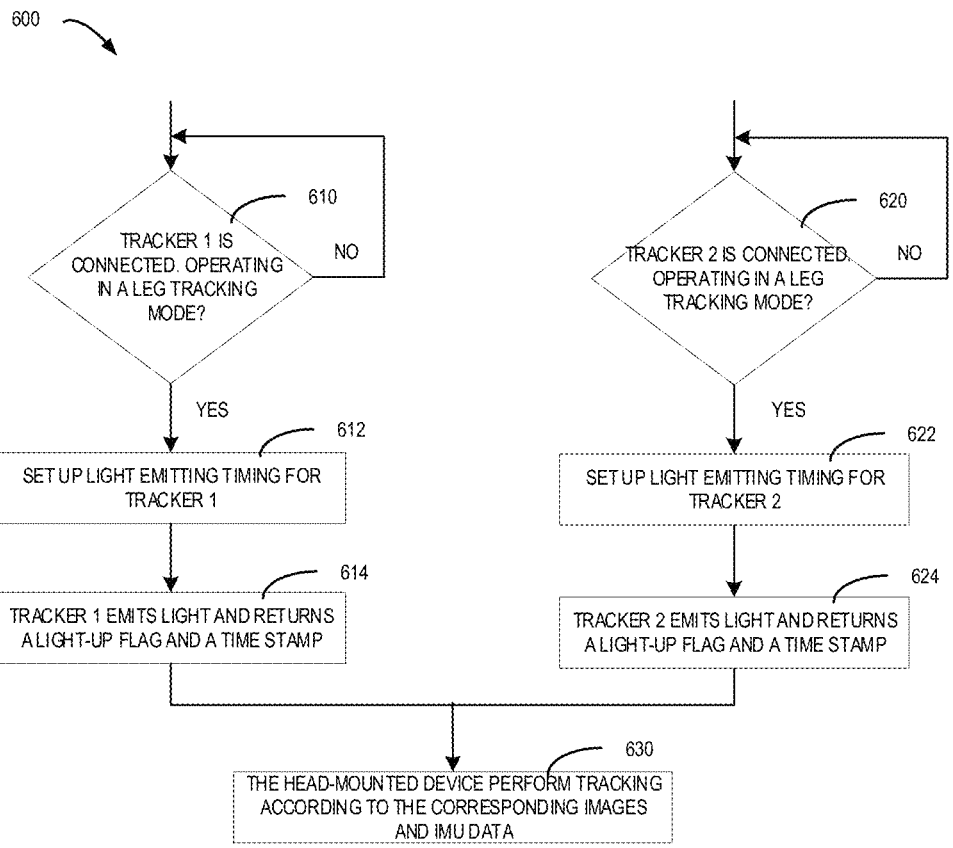
FIG. 6 illustrates a flowchart of an example process of connecting a plurality of trackers according to some embodiments of the disclosure.

FIG. 6 illustrates a flow diagram of an example process 600 of connecting a plurality of trackers according to some embodiments of the disclosure. The example process 600 involves a scene including tracker 1, tracker 2, and a head mounted device. For example, it is determined, by example process 500, that tracker 1 is in a leg mode (e. g., corresponding to a user's left ankle) and tracker 2 is in a leg mode (e. g., corresponding to a user's right ankle). Further, based on the tracker 1 and the tracker 2 being located on the left and right ankles, respectively, it may be determined which light emitting elements of each of the two trackers are enabled and their respective timing of light emission.

At block 610, the tracker 1 is connected to the head-mounted device. If it is determined to enter tracking mode from a standby mode, the process 600 proceeds to block 612. At block 612, the tracker 1 receives the synchronization signal sent by the head-mounted device and synchronizes with the head-mounted device. At block 614, the tracker 1, based on the previously determined optical configuration, emits light at the corresponding timing and returns a light-up flag and a time stamp.

If it is determined to enter tracking mode from standby mode, process 600 proceeds to block 622. In block 622, the tracker 2 receives the synchronization signal sent by the head mounted and synchronizes with the head mounted. The head mounted sets the timing of the light emission of the tracker 2. In block 624, the tracker 2 emits light at a respective timing and returns a light-on flag and a time stamp based on the previously determined optical configuration.

At block 630, the images of the tracker 1 and tracker 2 are acquired by the head-mounted device at the corresponding timing, so as to perform the tracking based on the corresponding images and IMU data.

Example Communication Timing

The system solution of the present disclosure may also comprise the configuration of a communication transmission mode among the plurality of first devices 110 and the second device 120, and may also comprise the adjustment of a corresponding tracking algorithm based on the configuration of the first devices 110. Specific examples of communication configurations of the tracker with the head mounted display are described below with reference to FIGS. 7 and 8.

Figure 7:
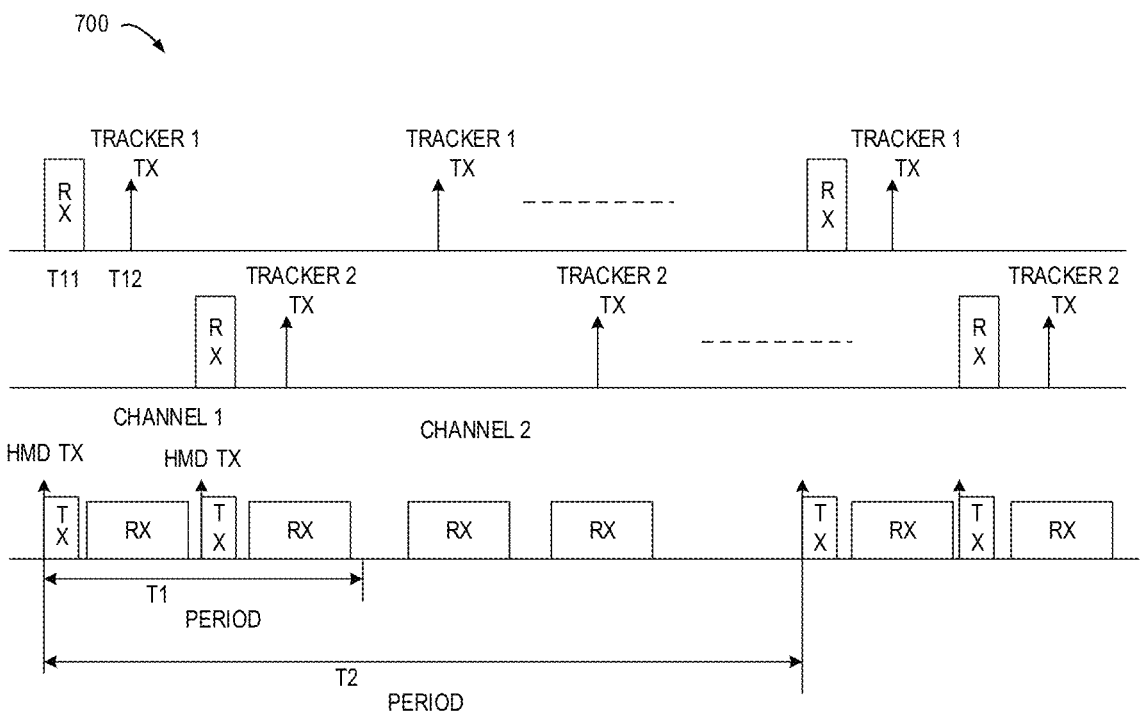
FIG. 7 illustrates a schematic of communication timing of a plurality of trackers with a head-mounted device according to some embodiments of the disclosure.

FIG. 7 illustrates a schematic diagram of communication timing 700 of a plurality of trackers with head-mounted device according to some embodiments of the disclosure. Communication timing 700 involves tracker 1, tracker 2, and head-mounted device. Tracker 1 and tracker 2 employ respective communication lists.

During a certain period of time, tracker 1, tracker 2 and the head-mounted device are all operating on channel 1 of tracker 1. Tracker 1 is in a receiving (RX) state, receives the beacon signal at t11 time instance and transmits (TX) data at t12 time instance. Meanwhile, the head-mounted device switches to the receiving state, and after a specific period, the tracker 1 and the head-mounted device both frequency-hop to the channel 2 of the tracker 1 to operate. Tracker 2 and tracker 1 operate similarly.

According to the pairing, sending and receiving timing is adjusted, and the tracker 1 and the tracker 2 constitute a periodic timing transmission, such as a period T1 as shown in the figure. The period T1 determines the highest data transmission frequency of the trackers, and the period T1 and the number of the trackers determine the communication transmission timing of the system. The head-mounted device and trackers may determine a data transmission channel and a data transmission time instance and a data receiving time instance by means of respective timing within a certain period of time. By adjusting the period T2, interference of the wireless communication with other frequency bands of the head mounted device, such as WiFi, Bluetooth devices, and so on, can be reduced.

Figure 8:
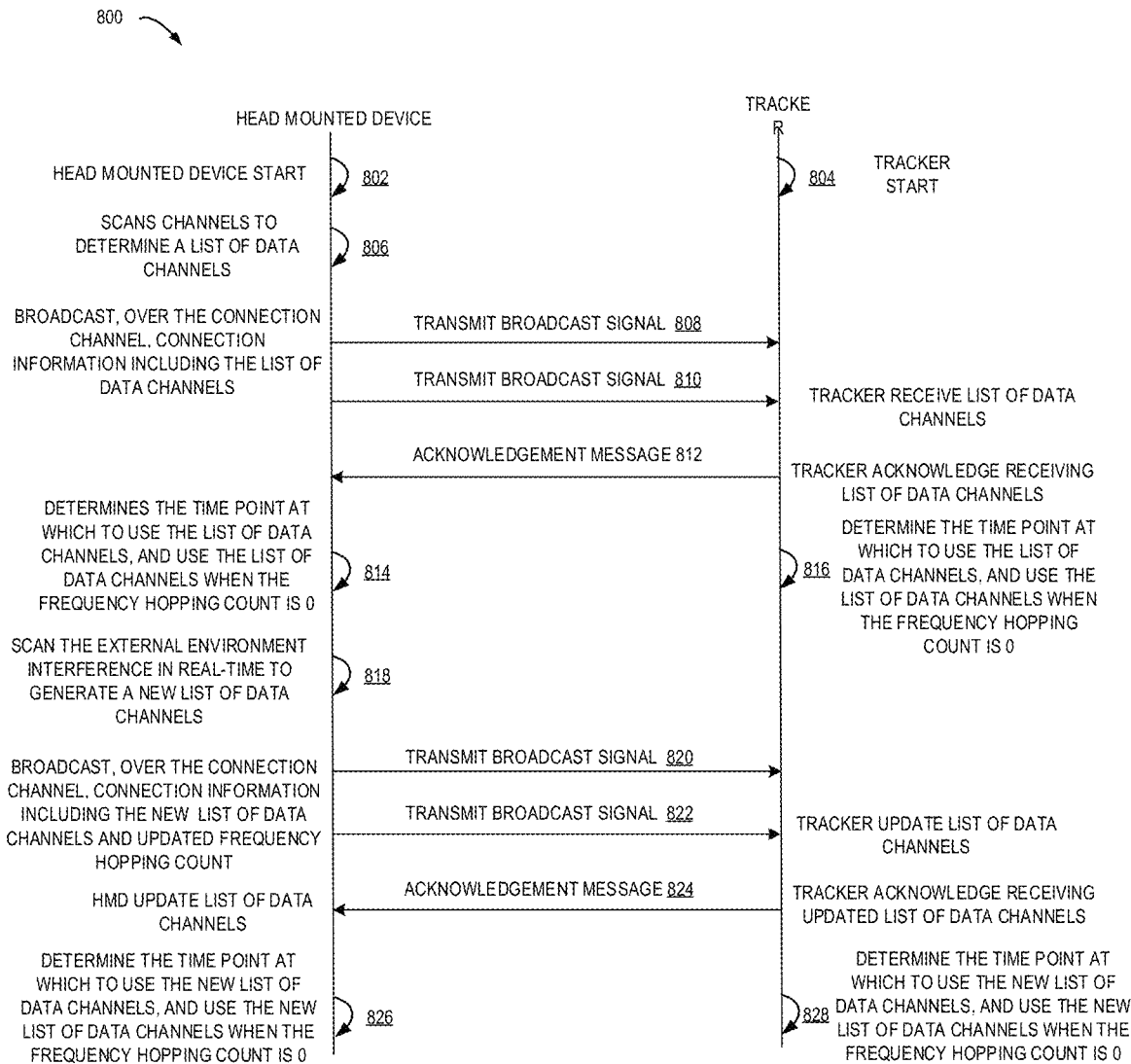
FIG. 8 illustrates a schematic diagram of an example signaling diagram of a tracker's backhaul and frequency hopping configuration for a head mounted device according to some embodiments of the present disclosure.

FIG. 8 is a schematic diagram of an example signaling diagram 800 of a tracker's backhaul and frequency hopping configuration for a head mounted device according to some embodiments of the disclosure. The example signaling diagram 800 involves a tracker and a head mounted device with a fixed backhaul channel. The backhaul link channel may be a single channel, or may be a fixed channel list. If it is a channel list, the connection logic includes that if the head-mounted device and the tracker are not connected successfully, the period for the head-mounted device to update the channel is inconsistent with the period for the tracker to update the channel. After the connection is successful, the head-mounted device and the tracker use the same periodic frequency hopping to keep the channel update consistent.

Specifically, at 802, the head-mounted device is started, and at 804, the tracker is started. At 806, the head-mounted device scans channels to determine a list of data channels, for example, a list of channels exceeding a predetermined noise floor, including channels 5 through 20. When the head-mounted device and the tracker are connected, the determined list of data channels may be included in the connection information. For example, the connection information may be broadcast over the connection channel, such information including the list of data channels. At 808, a broadcast signal is transmitted by the head-mounted device. The broadcast signal contains a list of data channels and a frequency hop count. If no acknowledgement from the tracker is received, this indicates that neither the head mounted device nor the tracker is connected successfully. Thus, the head mounted device may continue to transmit broadcast signals. For example, at 810, the head mounted device may continue to transmit broadcast signals. Each time a broadcast signal is transmitted, the frequency hopping count may be decremented. If the frequency hopping count is not zero, a broadcast signal is transmitted by the head mounted device, e. g., at 812. At 814, the tracker responds with acknowledgement information after receiving the list of data channels. At 818, the time point at which to use the list of data channels is determined by the head mounted device. At 816, the tracker determines the time point at which to use the list of data channels. When the frequency hopping count is zero, the head mounted device and the tracker use the confirmed list of data channels at the same time.

However, during the actual transmission, the external environment may have new sources of interference. At 818, the head mounted device scans the external environment interference in real-time to generate a new list of data channels. For example, connectivity information is broadcast on a connectivity channel, the connectivity information including a new list of data channels and an updated frequency hop count. At 820, a broadcast signal is transmitted by the head mounted device. The broadcast signal contains a list of data channels and a frequency hop count. Each time the broadcast signal is transmitted, the frequency hopping count is decremented by 1. If the frequency hopping count is not zero, the broadcast signal is transmitted, for example, at 822. At 824, the tracker responds with acknowledgement information after updating the list of the data channels. At 826, the head mounted device determines the point in time at which the new list of data channels was used. At 828, the tracker determines the point in time at which the new list of data channels was used. When the frequency hopping count is 0, the head mounted device and the tracker simultaneously use the new list of data channels.

Thus, whenever a frame of data update is successful at the channel update, the head mounted display and the tracker use the new channel list at the determined point in time. In this manner, channel interference issues in transmission may be resolved. Additionally or alternatively, frequency hopping counting may also use a reverse operation of plus 1.

Example Processes

Figure 9:
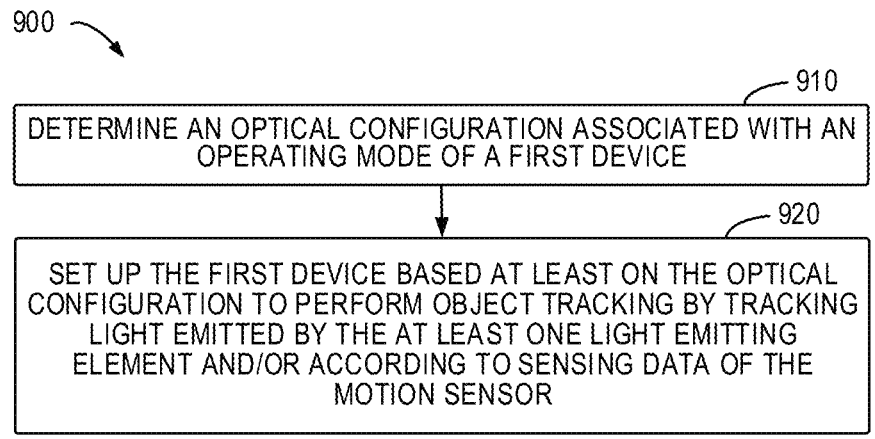
FIG. 9 illustrates a flowchart of a process for object tracking according to some embodiments of the disclosure.

FIG. 9 illustrates a flow diagram of a process 900 for object tracking according to some embodiments of the disclosure. The process 900 may be implemented at the first device 110, at the second device 110 or performed by both devices, or by other devices capable of communicating with first device 110 and second device 120.

At block 910, an optical configuration associated with an operating mode of a first device is determined. The first device includes a motion sensor and at least one light emitting element, and the optical configuration is used to control light emission of the at least one light emitting element.

At block 920, the first device is set up based at least on the optical configuration to perform object tracking by tracking light emitted by the at least one light emitting element and/or according to sensing data of the motion sensor.

In some embodiments, the operating mode is related to at least one of: a scene of the object tracking, or a base comprised in the first device or to which the first device is attached.

In some embodiments, the object tracking is performed by a second device, and an operating mode corresponding to a first base at a first predetermined position is a short range mode, and an operating mode corresponding to a second base at a second predetermined position is a long range mode. The first predetermined position and the second predetermined position are associated with an object wearing the second device, and the second predetermined position is farther away from a wearing position of the second device on the object than the first predetermined position.

In some embodiments, determining the optical configuration includes in response to that the operating mode is the long range mode, disabling a portion of the at least one light emitting element; and in response to that the operating mode is the short range mode, disabling a light emitting element on the first base.

In some embodiments, determining the optical configuration comprises: in response to that the operating mode is the long range mode, determining that an enabled light emitting element emits light at a first predetermined brightness; or in response to that the operating mode is the short range mode, determining that an enabled light emitting element emits light at a second predetermined brightness, the first predetermined brightness being higher than the second predetermined brightness.

In some embodiments, the process 900 also includes receiving an identification signal from the base; and determining the base based on the identification signal.

In some embodiments, determining the optical configuration includes in response to that the operating mode indicates that the first device is beyond a light tracking range for the object tracking, disabling the at least one light emitting element.

In some embodiments, setting up the first device based at least on the optical configuration comprises: determining a sensing configuration for the motion sensor associated with the operating mode; and setting up the first device based on the sensing configuration and the optical configuration.

In some embodiments, the first device is one of a plurality of first devices, and the optical configuration is associated with respective operating modes of the plurality of first devices.

In some embodiments, the first device is one of a plurality of first devices, and the optical configuration of the first device differs, at least in part, from optical configurations of other devices of the plurality of first devices than the first device.

In some embodiments, the optical configuration includes at least one of respective enabling states of the at least one light emitting element, a light spot pattern formed by an enabled light emitting element in the at least one light emitting element, a luminance of light emitted by the enabled light emitting element, a light emission timing of the enabled light emitting element.

In some embodiments, determining the optical configuration associated with the operating mode of the first device comprises: determining a first optical configuration based on the base; and determining a second optical configuration different from the first optical configuration based on the scene.

In some embodiments, the process 900 further includes in response to the first device being attached to the base, supplying power to the base through the first device.

In some embodiments, the process 900 further includes: tracking a combined spot of light emitted by the at least one light emitting element and light emitted by a light emitting element on the base; and performing the object tracking based on tracking of the combined light spot.

In some embodiments, the object tracking comprises tracking at least one of: the first device, or a body wearing the first device.

Example Apparatus and Devices

Figure 10:
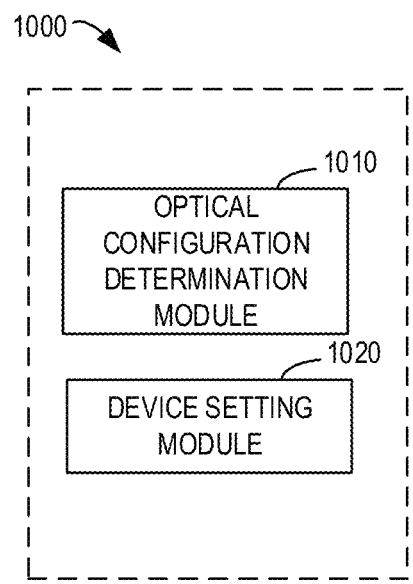
FIG. 10 illustrates a block diagram of an apparatus for object tracking according to some embodiments of the disclosure.

FIG. 10 shows a schematic structural block diagram of an apparatus 1000 for object tracking according to certain embodiments of the present disclosure. The apparatus 1000 may be implemented as or included in the first device 110 and/or the second device 120. The various modules/components of the apparatus 1000 may be implemented by hardware, software, firmware, or any combination thereof.

As shown, the apparatus 1000 includes an optical configuration determination module 1010 configured to determine an optical configuration associated with an operating mode of a first device, the first device comprising a motion sensor and at least one light emitting element, the optical configuration used for controlling light emission of the at least one light emitting element. The apparatus 1000 also includes a device setting module 1020 configured to set up the first device based at least on the optical configuration to perform object tracking by tracking light emitted by the at least one light emitting element and/or according to sensing data of the motion sensor.

In some embodiments, the operating mode is related to at least one of: a scene of the object tracking, or a base comprised in the first device or to which the first device is attached.

In some embodiments, the object tracking is performed by a second device, and an operating mode corresponding to a first base at a first predetermined position is a short range mode, and an operating mode corresponding to a second base at a second predetermined position is a long range mode. The first predetermined position and the second predetermined position are associated with an object wearing the second device, and the second predetermined position is farther away from a wearing position of the second device on the object than the first predetermined position.

In some embodiments, the optical configuration determination module 1010 is further configured to in response to that the operating mode is the long range mode, disable a portion of the at least one light emitting element; and in response to that the operating mode is the short range mode, disable a light emitting element on the first base.

In some embodiments, the optical configuration determination module 1010 is further configured to: in response to that the operating mode is the long range mode, determine that an enabled light emitting element emits light at a first predetermined brightness; or in response to that the operating mode is the short range mode, determine that an enabled light emitting element emits light at a second predetermined brightness, the first predetermined brightness being higher than the second predetermined brightness.

In some embodiments, the apparatus 1000 further comprises: a signal receiving module configured to receive an identification signal from the base; and determining the base based on the identification signal.

In some embodiments, the optical configuration determination module 1010 is further configured to in response to that the operating mode indicates that the first device is beyond a light tracking range for the object tracking, disable the at least one light emitting element.

In some embodiments, the device setting module 1020 is further configured to: determine a sensing configuration for the motion sensor associated with the operating mode; and set up the first device based on the sensing configuration and the optical configuration.

In some embodiments, the first device is one of a plurality of first devices, and the optical configuration is associated with respective operating modes of the plurality of first devices.

In some embodiments, the first device is one of a plurality of first devices, and the optical configuration of the first device differs, at least in part, from optical configurations of other devices of the plurality of first devices than the first device.

In some embodiments, the optical configuration includes at least one of respective enabling states of the at least one light emitting element, a light spot pattern formed by an enabled light emitting element in the at least one light emitting element, a luminance of light emitted by the enabled light emitting element, a light emission timing of the enabled light emitting element.

In some embodiments, the optical configuration determination module 1010 is further configured to: determine a first optical configuration based on the base; and determine a second optical configuration different from the first optical configuration based on the scene.

In some embodiments, the apparatus 1000 further includes a power supply module configured to in response to the first device being attached to the base, supply power to the base through the first device.

In some embodiments, the apparatus 1000 further comprises: a light spot tracking module configured to track a combined spot of light emitted by the at least one light emitting element and light emitted by a light emitting element on the base; and performing the object tracking based on tracking of the combined light spot.

In some embodiments, the object tracking comprises tracking at least one of: the first device, or a body wearing the first device.

Figure 11:
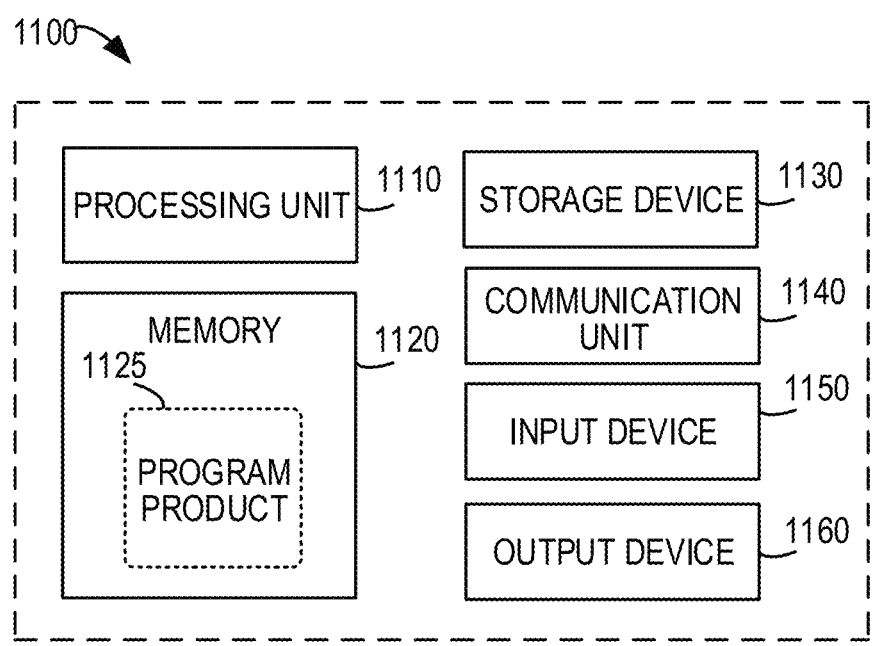
FIG. 11 illustrates a block diagram of a device capable of implementing various embodiments of the present disclosure.

FIG. 11 shows a block diagram illustrating electronic device 1100 in which one or more embodiments of the present disclosure may be implemented. It should be appreciated that the electronic device 1100 shown in FIG. 11 is merely exemplary and should not constitute any limitation on the functionality and scope of the embodiments described herein. The electronic device 1100 shown in FIG. 11 may be used to implement the first device 110 and/or the second device 120 of FIG. 1.

As shown in FIG. 11, electronic device 1100 is in the form of a general purpose electronic device. Components of electronic device 1100 may include, but are not limited to, one or more processors or processing units 1110, memory 1120, storage 1130, one or more communication units 1140, one or more input devices 1150, and one or more output devices 1160. The processing unit 1110 may be an actual or virtual processor and can perform various processes according to programs stored in the memory 1120. In a multiprocessor system, a plurality of processing units execute computer executable instructions in parallel, so as to improve the parallel processing capability of the electronic device 1100.

Electronic device 1100 generally includes a plurality of computer storage media. Such media may be any available media that is accessible by electronic device 1100, including, but not limited to, volatile and non-volatile media, removable and non-removable media. The memory 1120 may be volatile memory (e. g., registers, cache, random access memory (RAM)), non-volatile memory (e. g., read-only memory (ROM), electrically erasable programmable read-only memory (EEPROM), flash memory), or some combination thereof. The storage 1130 may be a removable or non-removable medium and may include a machine-readable medium such as a flash drive, a magnetic disk, or any other medium that may be used to store information and/or data and that may be accessed within the electronic device 1100.

The electronic device 1100 may further include additional removable/non-removable, volatile/nonvolatile storage media. Although not shown in FIG. 11, a magnetic disk drive for reading from or writing to a removable, nonvolatile magnetic disk such as a "floppy disk" and an optical disk drive for reading from or writing to a removable, nonvolatile optical disk may be provided. In these cases, each drive may be connected to a bus (not shown) by one or more data media interfaces. Memory 1120 may include a computer program product 1125 having one or more program modules configured to perform various methods or actions of various embodiments of the present disclosure.

The communication unit 1140 implements communication with other electronic devices through a communication medium. In addition, functions of components of the electronic device 1100 may be implemented by a single computing cluster or a plurality of computing machines, and these computing machines can communicate through a communication connection. Thus, the electronic device 1100 may operate in a networked environment using logical connections to one or more other servers, network personal computers (PCs), or another network node.

Input device 1150 may be one or more input devices such as a mouse, keyboard, trackball, etc. Output device 1160 may be one or more output devices such as a display, speakers, printer, etc. The electronic device 1100 may also communicate with one or more external devices (not shown) according to needs, such as a storage device, a display device, and the like, through the communication unit 1140, and communicate with one or more devices that enable a user to interact with the electronic device 1100, or communicate with any device (for example, a network card, a modem, and the like) that enables the electronic device 1100 to communicate with one or more other electronic devices. Such communication may be performed via an input/output (I/O) interface (not shown).

According to an exemplary implementation of the present disclosure, a computer-readable storage medium is provided, on which a computer-executable instruction is stored, wherein the computer-executable instruction is executed by a processor to implement the above-described method. According to an exemplary implementation of the present disclosure, there is also provided a computer program product, which is tangibly stored on a non-transitory computer-readable medium and includes computer-executable instructions that are executed by a processor to implement the method described above.

Aspects of the present disclosure are described herein with reference to flowchart illustrations and/or block diagrams of methods, apparatus, devices and computer program products implemented in accordance with the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processing unit of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer-readable program instructions may also be stored in a computer-readable storage medium that can direct a computer, programmable data processing apparatus, and/or other devices to function in a particular manner, such that the computer-readable medium storing the instructions includes an article of manufacture including instructions which implement various aspects of the functions/acts specified in the flowchart and/or block diagram block or blocks.

The computer readable program instructions may be loaded onto a computer, other programmable data processing apparatus, or other devices, causing a series of operational steps to be performed on a computer, other programmable data processing apparatus, or other devices, to produce a computer implemented process such that the instructions which execute on the computer, other programmable data processing apparatus, or other devices implement the functions/acts specified in the flowchart and/or block diagram block or blocks.

The flowchart and block diagrams in the Figures illustrate the architecture, functionality, and operation of possible implementations of systems, methods and computer program products according to various implementations of the present disclosure. In this regard, each block in the flowchart or block diagrams may represent a module, segment, or portion of an instruction which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described implementations of the disclosure above, the foregoing description is exemplary, not exhaustive, and is not limited to the implementations disclosed. Many modifications and variations will be apparent to those of ordinary skill in the art without departing from the scope and spirit of the implementations described. The choice of terms used herein is intended to best explain the principles of the implementations, the practical application, or improvements to technologies in the marketplace, or to enable others of ordinary skill in the art to understand the implementations disclosed herein.

What is claimed is:

1. A method of object tracking, comprising:
    determining an optical configuration associated with an operating mode of a first device, the first device comprising a motion sensor and at least one light emitting element, the optical configuration used for controlling light emission of the at least one light emitting element, wherein the operating mode is related to a base comprised in the first device or to which the first device is attached;
    setting up the first device based at least on the optical configuration to perform object tracking by tracking light emitted by the at least one light emitting element and/or according to sensing data of the motion sensor;
    tracking a combined spot of light emitted by the at least one light emitting element and light emitted by a light emitting element on the base; and
    performing the object tracking based on tracking of the combined light spot.

2. The method of claim 1, wherein the operating mode is further related to a scene of the object tracking.

3. The method of claim 2, wherein the object tracking is performed by a second device, and
    an operating mode corresponding to a first base at a first predetermined position is a short range mode, and an operating mode corresponding to a second base at a second predetermined position is a long range mode, and
    the first predetermined position and the second predetermined position are associated with an object wearing the second device, and the second predetermined position is farther away from a wearing position of the second device on the object than the first predetermined position.

4. The method of claim 3, wherein determining the optical configuration comprises:
    in response to that the operating mode is the long range mode, disabling a portion of the at least one light emitting element; and
    in response to that the operating mode is the short range mode, disabling a light emitting element on the first base.

5. The method of claim 3, wherein determining the optical configuration comprises:
    in response to that the operating mode is the long range mode, determining that an enabled light emitting element emits light at a first predetermined brightness; or
    in response to that the operating mode is the short range mode, determining that an enabled light emitting element emits light at a second predetermined brightness, the first predetermined brightness being higher than the second predetermined brightness.

6. The method of claim 2, further comprising:
receiving an identification signal from the base; and
determining the base based on the identification signal.

7. The method of claim 1, wherein determining the optical configuration comprises:
in response to that the operating mode indicates that the first device is beyond a light tracking range for the object tracking, disabling the at least one light emitting element.

8. The method of claim 1, wherein setting up the first device based at least on the optical configuration comprises:
determining a sensing configuration for the motion sensor associated with the operating mode; and
setting up the first device based on the sensing configuration and the optical configuration.

9. The method of claim 1, wherein the first device is one of a plurality of first devices, and the optical configuration is further associated with respective operating modes of the plurality of first devices.

10. The method of claim 1, wherein the first device is one of a plurality of first devices, and the optical configuration of the first device differs, at least in part, from optical configurations of other devices of the plurality of first devices than the first device.

11. The method of claim 1, wherein the optical configuration comprises at least one of:
respective enabling states of the at least one light emitting element,
a light spot pattern formed by an enabled light emitting element in the at least one light emitting element,
a luminance of light emitted by the enabled light emitting element,
a light emission timing of the enabled light emitting element.

12. The method of claim 2, wherein determining the optical configuration comprises:
determining a first optical configuration based on the base; and
determining a second optical configuration different from the first optical configuration based on the scene.

13. The method of claim 1, further comprising:
in response to the first device being attached to the base, supplying power to the base through the first device.

14. The method of claim 1, wherein the object tracking comprises tracking at least one of:
the first device, or
a body wearing the first device.

15. An electronic device, comprising:
at least one processing unit; and
at least one memory coupled to the at least one processing unit and storing instructions for execution by the at least one processing unit that, when executed by the at least one processing unit, cause the electronic device to perform a method of object tracking, comprising:
determining an optical configuration associated with an operating mode of a first device, the first device comprising a motion sensor and at least one light emitting element, the optical configuration used for controlling light emission of the at least one light emitting element, wherein the operating mode is related to a base comprised in the first device or to which the first device is attached;
setting up the first device based at least on the optical configuration to perform object tracking by tracking light emitted by the at least one light emitting element and/or according to sensing data of the motion sensor;
tracking a combined spot of light emitted by the at least one light emitting element and light emitted by a light emitting element on the base; and
performing the object tracking based on tracking of the combined light spot.

16. The device of claim 15, wherein the operating mode is further related to a scene of the object tracking.

17. The device of claim 16, wherein the object tracking is performed by a second device, and
an operating mode corresponding to a first base at a first predetermined position is a short range mode, and an operating mode corresponding to a second base at a second predetermined position is a long range mode, and
the first predetermined position and the second predetermined position are associated with an object wearing the second device, and the second predetermined position is farther away from a wearing position of the second device on the object than the first predetermined position.

18. The device of claim 15, wherein the first device is a tracker, the second device is a head mounted display device, and the electronic device includes at least one of the tracker or the head mounted display device.

19. A non-transitory computer readable storage medium having a computer program stored thereon, wherein the computer program is executable by a processor to implement a method of object tracking, comprising:
determining an optical configuration associated with an operating mode of a first device, the first device comprising a motion sensor and at least one light emitting element, the optical configuration used for controlling light emission of the at least one light emitting element, wherein the operating mode is related to a base comprised in the first device or to which the first device is attached;
setting up the first device based at least on the optical configuration to perform object tracking by tracking light emitted by the at least one light emitting element and/or according to sensing data of the motion sensor;
tracking a combined spot of light emitted by the at least one light emitting element and light emitted by a light emitting element on the base; and
performing the object tracking based on tracking of the combined light spot.

* * * * *